United States Patent [19]

Owens et al.

[11] Patent Number: 5,646,815

[45] Date of Patent: Jul. 8, 1997

[54] ELECTROCHEMICAL CAPACITOR WITH ELECTRODE AND ELECTROLYTE LAYERS HAVING THE SAME POLYMER AND SOLVENT

[75] Inventors: Boone B. Owens, Minneapolis; James M. Speckien, Vadnais Heights, both of Minn.

[73] Assignee: Medtronic, Inc., Minneapolis, Minn.

[21] Appl. No.: 459,918

[22] Filed: Jun. 2, 1995

Related U.S. Application Data

[62] Division of Ser. No. 984,133, Dec. 1, 1992.

[51] Int. Cl.$^6$ .................................................. H01G 9/00
[52] U.S. Cl. ........................ 361/502; 361/504; 361/505; 361/523; 361/525
[58] Field of Search ............................. 361/502, 523, 361/525–528, 532, 301.4, 303–305, 328–330, 503–505

[56] References Cited

U.S. PATENT DOCUMENTS

| | | |
|---|---|---|
| 3,419,760 | 12/1968 | Raleigh . |
| 4,638,407 | 1/1987 | Lundsgaard . |
| 4,730,239 | 3/1988 | Currie . |
| 4,748,542 | 5/1988 | Lundsgaard . |
| 4,792,504 | 12/1988 | Schwab . |
| 4,830,939 | 5/1989 | Lee et al. . |
| 5,080,963 | 1/1992 | Tatarchuk . |
| 5,212,622 | 5/1993 | MacFarlane et al. .................. 361/305 |

FOREIGN PATENT DOCUMENTS

| | | |
|---|---|---|
| 55817 | 3/1989 | Japan . |
| 14506 | 1/1990 | Japan . |
| 39513 | 2/1990 | Japan . |
| 2201287 | 8/1988 | United Kingdom . |

OTHER PUBLICATIONS

"Li$^+$–Conductive Solid Polymer Electrolytes with Liquid––Like Conductivity" by Abraham et al. in J. Electrochem. Soc., vol. 137, No. 5, May 1990.

"Room Temperative Polymer Electrolyte Batteries" by Abraham et al., 1992.

"Synthesis of Ionic Conducting Interpenetrating Polymer Networks", by Chiang et al. in Polymer Communications, vol. 28, Feb., 1987.

"New Directions in Polymer Electrolyte Battery Technology", by Barnett et al. Presented to The Third International Rechargeable Battery Seminar, Mar. 2–4, 1992.

"Conductivity of Electrolytes for Rechargeable Lithium Batteries" by Dudley et al. in Journal of Power Sources, 35 (1991) 59–82.

"New Conducting Polymer Networks", by X. Andrieu, J.P. Boeuve, France pp. 253–254 (No date provided).

"Some Recent Studies with the Solid–Ionomer Electrochemical Capacitor", by Sarangapani et al. in Journal of Power Sources, 36 (1991) 341–361.

"Metal–Carbon Composite Electrodes from Fiber Precursors", by Kohler et al. in J. Electrochem. Soc., vol. 137, No. 6, Jun., 1990.

"New Solid–State Electric Double–Layer Capacitor Using Poly(Vinyl Alcohol)–Based Polymer Solid Electrolyte," by Kanbara, et al., in Journal of Power Sources 36 (1991) 87–93.

"Laboratory Testing of High Energy Density Capacitors for Electric Vehicles", by A. F. Burke, Oct., 1991, by EG&G Idaho, Inc.

(List continued on next page.)

*Primary Examiner*—Bot L. Ledynh
*Attorney, Agent, or Firm*—Thomas F. Woods; Harold R. Patton; Daniel W. Latham

[57] ABSTRACT

An electrode material for an electrochemical capacitor and electrochemical capacitors utilizing the electrode material. The electrode material comprises electrically conductive carbon, a soluble salt, a non-aqueous liquid solvent, and a gel-former. Such a solid electrode material is especially well adapted for use in multi-layer capacitors in which such components can be made very thin, thereby providing a very low resistance for the device and permitting rapid discharge of the capacitor.

11 Claims, 1 Drawing Sheet

OTHER PUBLICATIONS

"Solid State Electrochemical Capacitors: Ultrathin Electrolyte Devices" presented at An International Seminar on Double Layer Capacitors and Similar Energy Storage Devices, by Boone B. Owens, Dec. 1991.

"A Study of Carbons and Graphite Anodes for Lithium Rechargeable Cells", by Mary Elizabeth Bolster of R&D Center, SAFT America Inc. 1991.

"High Voltage Capacitors for Implantable Defibrillators", by K. McNeil et al., of Intermedics, Inc., Freeport, TX (1992).

"Power Capacitor Requirements for Electric Vehicles", by Haskins et al. of the Electric Vehicle Program, Ford Motor Company, Dearborn, Michigan (1991).

ELECTROCHEMICAL CAPACITOR WITH ELECTRODE AND ELECTROLYTE LAYERS HAVING THE SAME POLYMER AND SOLVENT

This is a divisional of copending application Ser. No. 07/984,133 filed on Dec. 12, 1992 International Application filed on and which designated the U.S.

BACKGROUND OF THE INVENTION

This invention relates to electrochemical capacitors and especially to solid state capacitors having a plurality of electrodes and electrolyte layers.

Electrochemical capacitors fall into two broad categories; (1) double layer capacitors which rely solely on interfacial charge separation across the electrical double layer and (2) pseudocapacitors which have enhanced charge storage derived mainly from Faradaic transfer parallel with the double layer. Both types of capacitor offer major increases in capacitance density and energy storage capability when compared with conventional dielectric capacitors. They have the potential for extremely low values of electrical leakage unsurpassed by any other capacitive energy storage device. Electrochemical capacitors bridge the energy and power gap between batteries and capacitors. At the same time, they can exhibit both the cycle life and the stability expected of passive components.

In double layer capacitors, the components of the double layer capacitance are in electrical series leading to the equation $$1/C_{Total} = 1/C_H + 1/C_D$$

where $C_H$ and $C_D$ are the Helmholtz and diffuse layer capacitances respectively. If $C_D$ is large, as for example at high electrolyte concentrations, then the effective capacitance of the interface is more nearly equal to the Helmholtz capacitance. Conversely, when $C_D$ is low, as it will be at low concentrations, then the total capacitance tends to this value. Since concentrated electrolytes are utilized in electrochemical capacitors in order to achieve minimum resistance or ESR, the original Helmholtz concept will generally yield the more accurate values of capacitance. Since the charge or discharge of the double layer involves only a dipole reorientation process, it is a very rapid electrode reaction. When, on the other hand, charge storage is dependent on a charge transfer process, the kinetics will tend to be slower, and can be governed by diffusion in instances where chemical species from the bulk of either the electrode or the electrolyte are involved. Charge cannot leak across the double layer except by a charge transfer process. As a result, electrical leakage in double layer capacitors is intrinsically absent.

Pseudocapacitance is in parallel with the components of true double layer capacitance and thus gives rise to the possibility of considerably enhanced charge storage. Electrical response of a pseudocapacitor can often closely resemble that of a conventional double layer capacitor over a wide range of potential between the cathodic and anodic limits of electrolyte decomposition. The apparent DC capacitance (really the true double layer capacitance plus the pseudocapacitance) can be derived from triangular sweep/voltage curves by the equation $$C = i\,dt/dV$$

Also, the integral capacitance can be readily determined by means of constant current charging curves. The materials used in a pseudocapacitive couple include electrode materials which can be prepared in a stable, high surface area form and materials which can undergo reversible surface and or near-surface charge transfer reactions at relatively constant voltage. Certain of the conducting transition metal oxides, notably $RuO_2$, and $IrO_2$ have been found to fulfill these requirements. The clear advantage inherent in the use of a pseudocapacitive material for high rate, high energy density electrochemical capacitors is in the significantly higher capacitance densities achievable when compared with those for double layer capacitors.

The main design parameters to be considered in the selection of an electrochemical energy storage capacitor are voltage, capacitance, density, ESR, leakage current, and energy density. Other significant parameters are the load and charge-back profiles, duty cycle and repetition rate. The electrical means of coupling the capacitor with the load must also be defined.

The energy stored in a capacitor is given by the simple formula $$\tfrac{1}{2}CV^2$$

while the basic equations relating voltage and time for the charge and discharge of a capacitor which in turn govern power output are $$V_t = V_o(1 - e^{-t/Rc}) \qquad \text{(charge)}$$

$$V_t = V_o e^{-t/RC} \qquad \text{(discharge)}$$

where R is the equivalent series resistance (ESR). Maximum current and power levels are achieved by devices possessing the lowest value of ESR and the highest voltages. For constant coulombs charged into a device, the energy stored is directly proportional to voltage as a consequence of the fact that the expression $\tfrac{1}{2} CV^2$ is equivalent to $\tfrac{1}{2} QV$.

Solid state electrochemical capacitors can be made by using solid state electrolytes in place of more conventional liquid electrolyte materials. The advantages sought in solid state capacitors include the elimination of electrolyte leakage, improved operation at high and low temperatures, elimination of the need for a discrete separator element, the ease of miniaturization, multiple shape factors and the possibility of simple reliable designs for bipolar electrode cell stacks to allow fabrication of high voltage devices. However, the major problem with solid electrolytes is that they have much higher electrical resistances than liquid electrolytes which results in relatively high values of ESR for solid state capacitors. Typically, the conductivity of liquid electrolytes exceeds that of solid electrolytes by several orders of magnitude. Such low conductivity means that although the capacitor may have the ability to store a great deal of energy per unit volume, the time to discharge the energy stored in the capacitor is quite long and may make the capacitor unsuitable for many electronic applications for which the stored energy must be supplied at high voltages in milliseconds rather than in seconds or minutes. Since high voltages require multi-layer designs with cells connected in series, even a very low ESR for a cell can amount to an unacceptable ESR for the entire device. One example of such an application is the implantable heart defibrillator where high voltages (e.g. 800 volts) must be delivered from a capacitor within 5–15 milliseconds.

The conductivity issue has been addressed by the development of improved conductive polymeric electrolyte materials in both capacitors and batteries. For example, in U.S. Pat. Nos. 4,618,407 and 4,748,542 to Lundsgaard a polymer (e.g. polyethylene oxide), rendered ionically conductive by the addition of an inorganic salt (e.g. $LiClO_4$, $NaClO_4$, $LiCF_3SO_3$, or $LiBF_4$) was combined with activated carbon-containing electrodes to produce a multi-layer solid-state electrochemical capacitor. In U.S. Pat. No. 4,830,939 issued to Lee et al., a solid electrolyte for electrochemical cells is formed by mixing a liquid polymerizable compound, a radiation inert ionically conducting liquid and an ionizable alkaline metal salt and subjecting them to polymerizing radiation. In Abraham et al., $Li^+$-*Conductive Solid Polymer Electrolytes with Liquid-Like Conductivity*, J. Electrochem. Soc., Vol 137, No. 5, May 1990, a polymer network of polyacrylonitrile, poly(tetraethylene glycol diacrylate) or poly(vinyl pyrrolidone) is disclosed to immobilize a liquid solvent such as ethylene carbonate or propylene carbonate and a lithium salt. In a paper by Abraham, *Room Temperature Polymer Electrolyte Batteries* Fourth international Rechargeable Battery Seminar, Florida (March 1992), additional polymer networks using poly(bis-((methoxy ethoxy) ethoxy) phosphazene), poly(propylene oxide), and poly (ethylene oxide) are disclosed. In Kanbara et al., *New solid-state electric double-layer capacitor using poly (vinyl alcohol)-based polymer solid electrolyte*, Journal of Power Sources 36 (1991) 87–93 PVA was disclosed to dissolve large amounts of lithium salts to provide a solid-state electrolyte with good conductivity for double layer capacitors. In U.S. Pat. No. 4,792,504 issued to Schwab et al., a solid polymer electrolyte is disclosed with a continuous network of polyethylene oxide containing a dipolar aprotic solvent and a metal salt.

Another component of electrochemical capacitors that has received attention is the electrode. Carbon electrodes have been studied extensively. Carbon black has the drawback of high resistivity arising out of poor particle-to-particle contact. However, since the energy density of the capacitor is directly proportional to accessible surface area of electrode materials and since carbon black is known as an electrode material which can have surface areas in the range of 1000–2000 $m^2/g$, it is still highly desirable for electrochemical capacitor applications. The conductivity of solid state electrochemical capacitor electrodes can be enhanced by adding to the carbon a sulfuric acid aqueous solution such as that used in double layer capacitors sold under the tradename SUPERCAP by Nippon Electric Company (NEC). Conductivity can also be improved by including in the carbon electrode an ionically conducting polymer (e.g. polyethylene oxide) and an inorganic salt as set forth in U.S. Pat. Nos. 4,618,407 and 4,748,542 to Lundsgaard. Also, in Japanese Kokai Patent Application No. HEI 2[1990]-39513, carbon is impregnated with a polymeric solid electrolyte made with a solid solution of a polyether polymer and an alkali metal salt. However, carbon electrodes using these solid electrolytes still lack the conductivity needed for many double layer capacitor applications.

It is therefore an object of the present invention to provide an electrochemical capacitor with improved ESR.

It is also an object of the present invention to provide a high voltage, multi-layer electrochemical capacitor with an improved ESR.

SUMMARY OF THE INVENTION

These and other objects are accomplished by the present invention. We have discovered an improved electrode material for an electrochemical capacitor, a multi-layer capacitor employing an improved electrode material and a method for making the improved electrode material and electrochemical capacitor.

The electrode material comprises at least 5 wt % of an electrically conductive carbon having a surface area greater than 200 $m^2/g$, a soluble salt, a non-aqueous liquid solvent, and a gel-former. The electrically conductive carbon can be, for example, activated carbon, carbon black or a mixture of activated carbon and carbon black. The soluble salt can be an alkali metal salt such as the lithium salts $LiClO_4$, $LiAsF_6$, $LiPF_6$, $LiCF_3SO_3$, or $LiBF_4$, similar salts of sodium, potassium or magnesium; alkaline earth salts, and organic substituted ammonium cation salts and other organic substituted onium salts. The non-aqueous liquid solvent can be a low molecular weight polar solvent, for example, ethylene carbonate or propylene carbonate or, preferably a mixture of ethylene carbonate and propylene carbonate. The gel-former is preferably an acrylonitrile-based polymer although polymers such as polyvinylpyrrolidone (PVP) or poly (tetraethylene glycol)diacrylate (PEGDA) could also be used.

The electrode material can be made by mixing electrically conductive carbon with the non-aqueous liquid solvent and then mixing the resulting mixture with a gelled composite material comprising a soluble salt, a non-aqueous liquid solvent and a gel-former. The final mixture can be degassed in a vacuum to remove volatile impurities and then formed into a film by casting or pressing methods. A conductive current collector can then be pressed onto the film to make a completed electrode structure.

Electrodes of this type can be used to make solid electrochemical capacitors. Such capacitors have at least two electrodes, where at least one electrode has the composition described above and also at least one ionically conductive electrolyte layer in contact with the electrode layers to serve as both a separator and as the electrolyte. The electrolyte layer is preferably comprised of an alkali metal salt and a polymer. An electrolyte composition such as that in U.S. Pat. Nos. 4,618,407 and 4,748,542 to Lundsgaard could be used for the electrolyte layer. Such solid electrochemical capacitor components are especially well adapted for use in multi-layer capacitors in which a plurality of electrode layers, a plurality of electrolyte layers, and a plurality of current collectors are used in an operative relationship. The collector elements can be either connected in series or parallel if connected in series, the capacitor can provide a high output voltage. Capacitors having such components can be made very thin, thereby providing a very low ESR for the device and permitting rapid discharge of the capacitor.

DETAILED DESCRIPTION OF THE INVENTION

Figure 1:
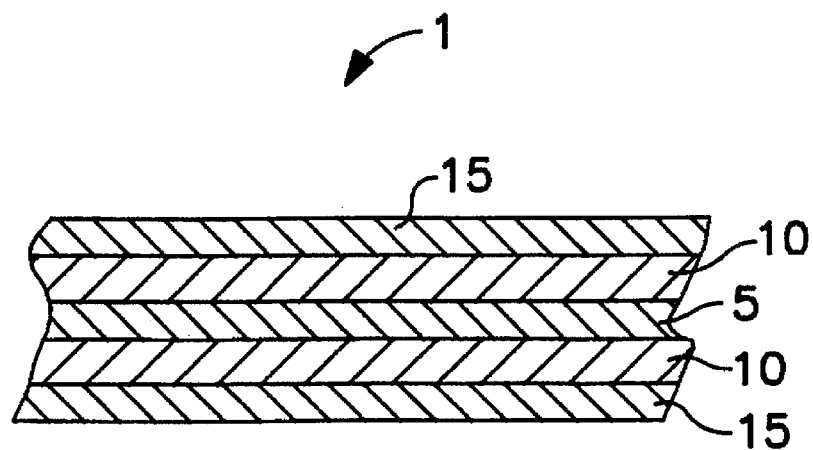
FIG. 1 is a cross sectional view of a single cell electrochemical capacitor made according to the present invention.

According to the present invention, an improved electrode material for an electrochemical capacitor can be made. The electrode material comprises at least 5 wt % (preferably at least 10 wt %) of an electrically conductive carbon having a surface area greater than 200 $m^2/g$ (preferably greater than 500 $m^2/g$), a soluble salt, a non-aqueous liquid solvent, and a gel-former. The types of carbon that may be employed in the present invention include carbon black, active carbons and carbon fibers. Carbon blacks are carbons typically produced from the thermal decomposition or partial oxidation of various hydrocarbons. Carbon black can include acetylene black which has been widely used in battery electrode compositions. Active carbons are carbons typically produced from materials such as coconut shells or petroleum coke by thermal decomposition in the presence of steam. Carbon fiber is a carbon typically made from thermal oxidation and pyrolysis of materials such as polyacrylonitrile and rayon. The electrically conductive carbon can be, for example, activated carbon, carbon black, carbon fibers or mixtures of activated carbon, carbon black and carbon fibers. For example, some carbons store more energy because they have higher surface area but they may not have the highest conductivity. Other carbons may have a morphology that facilitates high discharge but may only store a limited amount of energy. By combining two or more carbons, such as carbon black and activated carbon, the properties of the electrode may be optimized. Preferably, carbon is loaded into the electrode at a wt % above 5% and most preferably in the 10–30% range although the most desirable carbon content will depend on the type of carbon, the type of soluble salt used and the type of liquid solvent used.

The soluble salt used in the electrode of the present invention can be any such salt which is soluble in the solvent employed in the electrode to impart ionic conductivity to the electrode. For example, alkali metal salts such as the lithium salts $LiClO_4$, $LiAsF_6$, $LiPF_6$, $LiCF_3SO_3$, $LiN(CF_3SO_2)_2$ or $LiBF_4$, similar salts of sodium, potassium or magnesium could be used. Further, alkaline earth salts, and organic substituted ammonium cation salts (e.g. $(C_2H_5)_4NBF_4$) or other organic substituted phosphonium and sulfonium salts could be used. The amount of soluble salt used in the electrode composition can vary widely depending on the specific salt used, however, an amount in the range of about 5 wt % to 20 wt % could generally be used.

The non-aqueous liquid solvent used in the electrode of the present invention can be an aprotic organic solvent which is a liquid at the temperature at which the electrochemical capacitor will be used. This can include, for example, the solvents listed in Dudley et al., *Conductivity of electrolytes for rechargeable lithium batteries*, Journal of Power Sources, 35 (1991) 59–82, which is incorporated herein by reference. Thus, ethylene carbonate (EC), propylene carbonate (PC), 2-methyl tetrahydrofuran (2MeTHF), sulfolane, triglyme and mixtures thereof such as EC/PC, 2MeTHF/EC/PC or sulfolane/triglyme could be used. Preferably, the solvent is a 1,3-dioxolane-2-one such as either ethylene carbonate or propylene carbonate and, most preferably, the electrolyte is a liquid mixture of ethylene carbonate and propylene carbonate. The amount of solvent used in the electrode is preferably enough to just wet the other electrode components and allow them to be formed into the desired shape. Preferably, a portion of the soluble salt is first dissolved in the solvent and then the salt/solvent is combined with the conductive carbon to provide an intimate mixture of salt, solvent and carbon. Following forming of the electrode, excess solvent may be removed, for example, by contacting the electrode with materials which absorb the excess solvent.

The gel-former used to make the electrode of the present invention is a material capable of providing the electrode with a formable, cohesive network which immobilizes the carbon, salt and solvent. Preferably, it makes an electrode composition that is a rubbery solid at room temperature with only a relatively small amount of gel-former material in the composition. A polymer gel-former can be crosslinked after forming if additional structural strength is required. The gel-former used in the present invention is therefore preferably an acrylonitrile-based polymer although other polymers such as those found in Abraham, $Li^+$-*Conductive Solid Polymer Electrolytes with Liquid-Like Conductivity*, J. Electrochem. Soc., V. 137, N. 5, May 1990 could also be used. Therefore polymers such as polyvinylpyrrolidone (PVP), poly[(tetraethylene glycol) diacrylate] (PEGDA) and mixtures of such polymers could be used as well as mixtures of such polymers with polyacrylonitrile. To make electrodes with high amounts of carbon, the ingredients are preferably mixed from certain premixed components. First, the solvent is premixed into a stock solution which includes the solvent and dissolved salt. A portion of this liquid electrolyte stock solution is then premixed with the electrically conductive carbon in order to allow it to mix well with the other components of the electrode mixture. Preferably, the amount of stock solution added to the carbon is just enough to wet the carbon. A portion of the liquid electrolyte stock solution is also combined with the gel-forming polymer to provide a gelled electrolyte composition. The gelled electrolyte composition is then added to the carbon premix and thoroughly mixed to provide the electrode composition of the present invention. Preferably, the components are heated during the mixing step to make it easier to provide a uniform mixture. Also, preferably, the final mixture should be degassed in a vacuum to remove entrapped gases and volatile impurities. The resulting mixture can then be formed into a film by casting or pressing methods. In a preferred method, the mixture is heated until it is flowable, and is then pressed between heated plates to provide an electrode of the desired thickness.

Alternatively, one could press the electrode composition between polymer films or sheets which could then provide a support for the formed electrode material during subsequent transport, cutting or slitting operations. The electrode material could also be used in a process to provide a continuous film of very thin electrode material by extrusion of the material between rollers and onto a support web. A conductive current collector can also be pressed onto the film to make a completed electrode structure suitable for use in electrochemical devices such as electrochemical capacitors. The electrode composition could also be diluted and prepared as solutions which can then be formed into thick or thin films by conventional techniques such as doctor blade casting, hot pressing, solvent casting, dip coating, spin coating, extrusion or silk screening.

Figure 2:
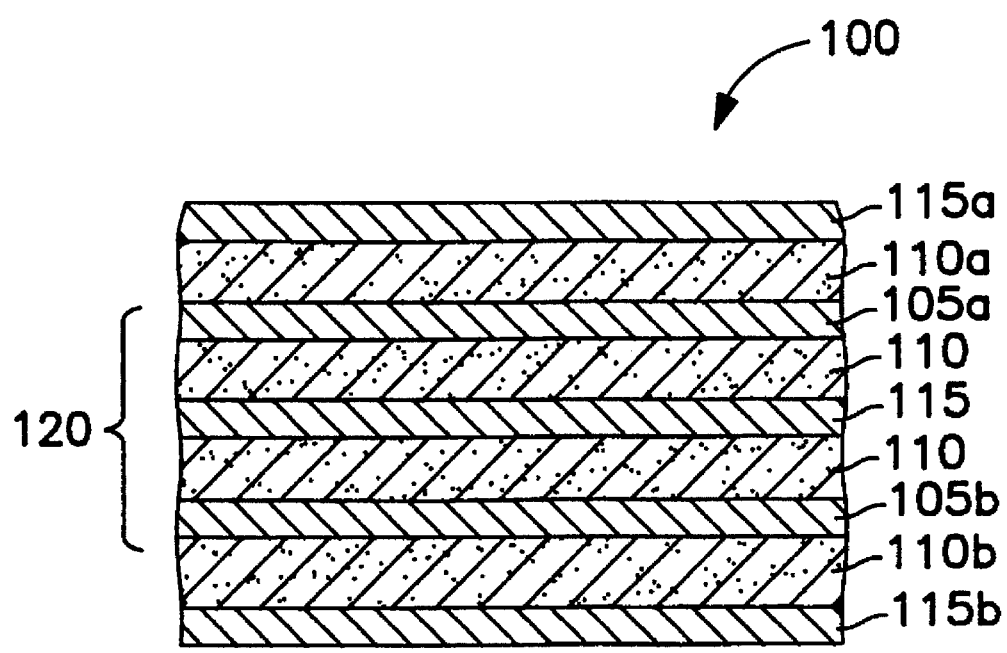
FIG. 2 is a cross sectional view of a multi-layer electrochemical capacitor made according to the present invention.

The electrode composition of the present invention can be used to make capacitors in a wide variety of capacitor shapes and sizes. For example, prismatic cells could be made by cutting out electrode and electrolyte sheet material and stacking them as shown in FIG. 1. FIG. 1 shows a capacitor 1 made up of an electrolyte layer 5 interposed between and in contact with electrode layers 10 made according to the present invention and current collectors 15 in contact with the electrode layers 10. A prismatic, multi-layer capacitor could also be made by merely stacking together additional capacitor cells or by making a bipolar device such as that shown in FIG. 2. FIG. 2 shows a bipolar capacitor structure 100 which can be made by combining in sheet form a current collector layer 115 with electrode layers 110 on opposing faces of the current collector 115 and then applying in sheet form an electrolyte layer 105 to provide a subassembly sheet 120 including the foregoing layers. The subassembly sheet 120 can then be cut and stacked on top of each other in repetition until the desired number of layers are arrived at. In FIG. 2 only one such layer is shown. At the top of the stack, an electrolyte layer 105a, an electrode layer 110a and a current collector top plate 115a are provided; and at the bottom of the stack, an electrode layer 110b and a current collector bottom plate 115b are provided. Electrical connections can then be made to the top plate 115a and bottom plate 155b. Capacitors made in a thin-film design can also have cells connected in series or parallel by means well known in the art to provide high or low voltage devices. One such method is the use of an accordion-folded structure where thin films of electrode and electrolyte materials are made in a long strip and are folded in an accordion fashion to make a prismatic structure. Another efficient capacitor design is the spiral wrapped design which can also be made from strips of electrode and electrolyte materials rolled into a spiral.

The thickness of the formed electrode can be critical to many applications for the electrode in electrochemical capacitors. The thickness can affect the capacitance, energy density and discharge response time of the device. For example, a capacitor with the electrode composition of the present invention could be made to have the discharge response times set forth in Table 1 by providing electrodes of approximately the given thickness.

TABLE 1

| Response Time(s) | Nominal Electrode thickness (μm) |
|---|---|
| 100 | 500 |
| 10 | 100 |
| 1 | 50 |
| .1 | 10 |
| .01 | 5 |
| .001 | 1 |

Preferably, therefore, the thickness of the electrode is less than about 50 μm for many electronics applications and most preferably less than about 5 μm for use in such devices as implantable cardiac defibrillators.

The following examples illustrate several embodiments of the present invention.

EXAMPLE 1

A gelled electrolyte material was made using 8% polyacrylonitrile, 40% propylene carbonate, 40% ethylene carbonate and 12% lithium triflate.

The solid lithium triflate and ethylene carbonate were dissolved into the liquid propylene carbonate with heating and stirring to make a stock liquid electrolyte solution. The polyacrylonitrile was powdered to facilitate dissolution and was combined with the stock liquid electrolyte solution. With continuous stirring, the material was heated to a temperature of 80°–140° C. The polyacrylonitrile dissolved abruptly, resulting in a highly viscous melt. Stirring was continued to ensure homogeneity. The melt was transferred to a vacuum oven held at a nominal 140° C. and was evacuated to withdraw any volatile impurities and gas bubbles. The material was then cooled to room temperature where it solidified into a rubbery, solid mass.

EXAMPLE 2

The gelled electrolyte composition of Example 1 was melted and cast into a film.

The composition was remelted and while hot was pressed between two flat, parallel glass plates at a force of 20–60 pounds. Shims and/or masking materials were used to control the thickness of the pressed material. When cooled to room temperature, the material was in the form of transparent sheets between 50–1000μm thick. It was readily removed from the press. In order to remove excess liquid electrolyte from the pressed film, the film was stacked with alternating layers of paper towels and a pressing weight was applied to the stack for one half hour to 24 hours.

EXAMPLE 3

Electrodes were made from various carbons and the gelled electrolyte composition from Example 1.

Carbon samples were dried at 210° C. for 160 h and were thereafter maintained in a dry room. The carbon was then mixed in the desired proportions with the gelled electrolyte composition from Example 1 and was heated with stirring at about 120°–150° C. The hot mix was transferred to a vacuum oven at about 120°–150° C. and a vacuum was carefully applied to remove entrapped gasses and volatile impurities. The vacuum was maintained for about 30 minutes. Samples of the degassed material were poured while hot onto molds, flat metal sheets, plastic sheets or flat glass plates as desired and were pressed with a platen to reduce thickness as set forth in Example 2.

EXAMPLE 4

Electrodes were made from various carbons and the gelled electrolyte composition from Example 1 and the stock liquid electrolyte from Example 1.

Carbon samples were dried at 210° C. for 160 h and were thereafter maintained in a dry room. The carbon was then mixed in with the stock liquid electrolyte from Example 1 until the carbon appeared to be a "slightly moist" mix. A desired amount of the gelled electrolyte material from Example 1 was then melted at about 140° C. and the mixture of carbon and liquid electrolyte was added slowly with mixing until a desired consistency was achieved. Representative electrode compositions are set forth in Table 2. The mixture was transferred to a vacuum oven at about 120°–150° C. and a vacuum was applied for about 30 minutes. Samples were poured while hot onto a glass plate preheated to about 140° C. and were pressed by a second glass plate into films of about 50 μm thick.

TABLE 2

| Carbon | Liquid Electrolyte | Gelled electrolyte |
|---|---|---|
| 5 g. Activated Carbon | 10.13 g | 25.5 g. |
| 5 g. Carbon Fibers | 6.03 g. | 15.5 g. |
| 1.54 g. Acetylene Black | 10.77 g. | 12.1 g. |
| 2.8 g. Carbon Black | 25.5 g. | 22 g. |

EXAMPLE 5

Electrodes were made by combining carbons with different properties.

0.25 g. carbon black was added to 3.0 g. of the liquid electrolyte from Example 1. 0.85 g. activated carbon and 0.9 g. liquid electrolyte were added to the mixture. 0.5 g. of polyacrylonitrile was stirred into 3.1 g of the liquid electrolyte from Example 1 while heating to 100°–140° C. to obtain a thick, viscous solution. The carbon black and liquid electrolyte were combined with the polyacrylonitrile and liquid electrolyte slowly, with mixing. About 1 g. of additional liquid electrolyte was added to reduce the viscosity of the mixture. The mixture was then degassed as in Example 4 and cast into a film.

EXAMPLE 6

Single cell capacitors were made from electrolyte films made according to Example 2 and from electrodes made according to Example 4.

An electrolyte film cut into a disk shape was placed between two electrode films also cut into disk shapes. The cells were assembled in a dry room and clamped between inert metal foil electrode contacts.

EXAMPLE 7

A spiral wrapped cell capacitor was made from an electrolyte film made according to Example 2 and from electrodes made according to Example 4.

A long strip cell was made using aluminum foil as a current collector. The arrangement of elements was: Aluminum/Electrode/Electrolyte/Electrode/Aluminum/ Insulator. The strip cell was spirally wound into a cylindrical shape. The resulting cell had a resistance of 1.5 ohms and could be charged to 5 volts.

EXAMPLE 8

A high voltage stack capacitor was made from electrolyte films made according to example 2 and from electrodes made according to Example 4.

Electrode and electrolyte layers averaging about 300 μm in thickness were Combined as set forth in Example 6 with a 2 cm$^2$ area. 25 of the cells were stacked in series in a single container to form a 125 volt capacitor. It was tested to 115 volts.

It will be appreciated by those skilled in the art that while the invention has been described above in connection with particular embodiments and examples, the invention is not necessarily so limited and that numerous other embodiments, examples, uses, modifications and departures from the embodiments, examples and uses may be made without departing from the inventive concepts.

We claim:

1. An electrochemical capacitor, comprising:
   a. an electrode layer having electrically conductive carbon, a soluble salt, a non-aqueous aprotic liquid solvent, and a polymer; and
   b. an ionically conductive electrolyte layer in contact with the electrode layer, the electrolyte layer comprising an alkali metal salt, the polymer, and the non-aqueous aprotic liquid solvent;

the polymer and the solvent being the same in each of the electrode layer and the electrolyte layer.

2. An electrochemical capacitor according to claim 1 also comprising a current collector in electrical contact with the electrode layer.

3. An electrochemical capacitor according to claim 2 wherein the capacitor is a multi-layer capacitor comprising a plurality of electrode layers, a plurality of electrolyte layers, and a plurality of current collectors in an operative relationship.

4. An electrochemical capacitor according to claim 3 wherein the current collectors are electrically connected in series.

5. An electrochemical capacitor according to claim 3 wherein the current collectors are electrically connected in parallel.

6. An electrochemical capacitor according to claim 1 wherein the electrode layer is less than 25 μm thick.

7. An electrochemical capacitor according to claim 1 wherein the electrolyte layer is less than 50 μm thick.

8. An electrochemical capacitor according to claim 1 wherein the electrically conductive carbon is selected from the group consisting of activated carbon, carbon black, carbon fiber and mixtures thereof.

9. An electrochemical capacitor according to claim 1 wherein the soluble salt is selected from the group consisting of $LiClO_4$, $LiAsF_6$, $LiPF_6$, $LiCF_3SO_3$, $LiN(CF_3SO_2)_2$ and $LiBF_4$.

10. An electrochemical capacitor according to claim 1, wherein the liquid solvent is selected from the group consisting of ethylene carbonate, propylene carbonate, 2-methyl tetrahydrofuran, sulfolane, triglyme and mixtures thereof.

11. An electrochemical capacitor according to claim 1, wherein the polymer is selected from the group consisting of polyacrylonitrile, poly vinyl pyrrolidine, poly tetraethylene glycol, diacrrylate and mixtures thereof.

* * * * *

UNITED STATES PATENT AND TRADEMARK OFFICE
CERTIFICATE OF CORRECTION

PATENT NO.   : 5,646,815
DATED        : July 8, 1997
INVENTOR(S)  : Boone B. Owens, et. al.

It is certified that error appears in the above-identified patent and that said Letters Patent is hereby corrected as shown below:

Column 2, line 26 "" should read -- $V_t = V_o(1-e^{-t/RC})$ --

Column 3, line 15, "international" to be changed to "International"

Column 9, line 23, "Combined" to be changed to "combined"

Signed and Sealed this

Thirtieth Day of November, 1999

Attest:

Q. TODD DICKINSON

Attesting Officer

Acting Commissioner of Patents and Trademarks